United States Patent [19]

Kanome et al.

[11] Patent Number: 5,503,888
[45] Date of Patent: Apr. 2, 1996

[54] OPTICAL RECORDING MEDIUM, SUBSTRATE FOR OPTICAL RECORDING MEDIUM, AND METHOD FOR PREPARING SUBSTRATE FOR OPTICAL RECORDING MEDIUM

[75] Inventors: Osamu Kanome; Hirofumi Kamitakahara; Naoki Kushida, all of Yokohama; Hitoshi Yoshino, Zama; Toshiya Yuasa, Kawasaki; Takashi Kai, Hadano, all of Japan

[73] Assignee: Canon Kabushiki Kaisha, Tokyo, Japan

[21] Appl. No.: 77,057

[22] Filed: Jun. 16, 1993

[30] Foreign Application Priority Data

Jun. 19, 1992 [JP] Japan .................. 4-161345

[51] Int. Cl.⁶ .................................. B32B 3/02
[52] U.S. Cl. .................. 428/64.7; 428/195; 428/411.1; 428/412; 428/913; 346/135.1
[58] Field of Search .................. 430/271, 273, 430/275, 495, 945; 346/135.1; 428/64, 65, 68, 16, 412, 913, 411.1, 195; 364/288

[56] References Cited

U.S. PATENT DOCUMENTS 1,466,733  9/1923  Sulzer et al. .

(List continued on next page.)

FOREIGN PATENT DOCUMENTS

| 0369780 | 5/1990 | European Pat. Off. . |
| 2413798 | 10/1974 | Germany . |
| 3903487 | 8/1989 | Germany . |
| 3-39326 | 2/1991 | Japan . |

OTHER PUBLICATIONS

Patent Abstracts of Japan, vol. 11, No. 106 (Apr. 3, 1987).
Patent Abstracts of Japan, vol. 15, No. 151 (Apr. 16, 1991).
Database WPI, Section EI, Week 8838, Derwent Publications Ltd., Class T03, AN 88–266722.

(List continued on next page.)

Primary Examiner—Patrick J. Ryan
Assistant Examiner—William A. Krynsks
Attorney, Agent, or Firm—Fitzpatrick, Cella, Harper & Scinto

[57] ABSTRACT

An optical recording medium is disclosed which comprises a substrate containing a polycarbonate resin and a recording layer. The substrate contains copolycarbonate resin having constitutional units represented by the formulae (x) and (y)

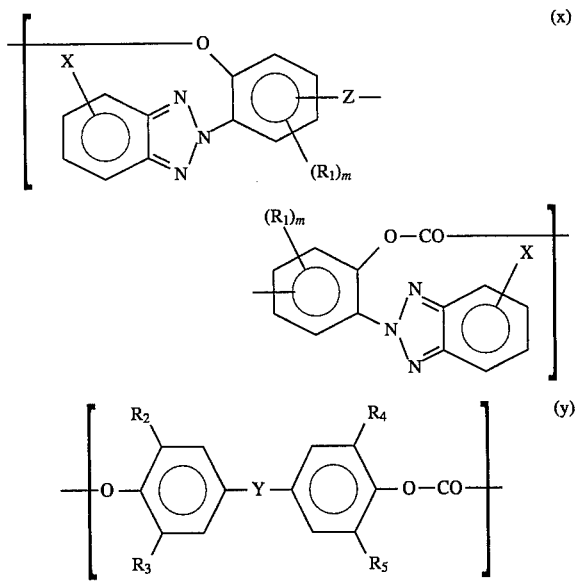

[wherein Z of the formula (x) is a direct bond, alkylidene, —O—, —S— or —SO$_2$—; X is H, halogen, alkyl, aryl, aralkyl, alkoxy, aryloxy or aralkyloxy; R$_1$ is H, alkyl or aralkyl; m is an integer of 1 to 3; Y of the formula (y) is alkylidene, aryl-substituted alkylene, aryl, —O—, —S—, —CO— or —SO$_2$—; and each of R$_2$, R$_3$, R$_4$ and R$_5$ is H, halogen or alkyl].

31 Claims, 2 Drawing Sheets

U.S. PATENT DOCUMENTS

| | | | |
|---|---|---|---|
| 3,751,550 | 8/1973 | Nauta | 264/275 |
| 3,756,760 | 9/1973 | McBride | 425/363 |
| 3,839,514 | 10/1974 | Nauta | 264/1 |
| 4,790,893 | 12/1988 | Watkins | 156/232 |
| 4,836,874 | 6/1989 | Foster | 156/209 |
| 4,871,601 | 10/1989 | Miura et al. | 428/64 |
| 4,952,664 | 8/1990 | Masumoto et al. | 528/199 |
| 4,954,380 | 9/1990 | Kanome et al. | 428/64 |
| 4,965,118 | 10/1990 | Kodera et al. | 428/137 |
| 4,965,153 | 10/1990 | Imataki et al. | 430/11 |
| 4,968,370 | 11/1990 | Watkins | 156/232 |
| 4,997,744 | 3/1991 | Kalyanaraman et al. | 430/271 |
| 4,997,903 | 3/1991 | Okamoto | 528/198 |
| 5,026,623 | 6/1991 | Imataki et al. | 430/270 |
| 5,075,060 | 12/1991 | Imataki | 264/167 |
| 5,137,661 | 8/1992 | Kanome et al. | 264/1.3 |
| 5,158,859 | 10/1992 | Imatake et al. | 430/271 |

OTHER PUBLICATIONS

Database WPI, Section CH, Week 8521, Derwent Publications Ltd., Class E05, AN 85–126083.

Patent Abstracts of Japan, vol. 15, No. 173, p. 86 (May 2, 1991).

Chemical Abstracts Ca 115(8):72490A Kanayama, JP 91–039326 Polycarbonate Resins.

OPTICAL RECORDING MEDIUM, SUBSTRATE FOR OPTICAL RECORDING MEDIUM, AND METHOD FOR PREPARING SUBSTRATE FOR OPTICAL RECORDING MEDIUM

BACKGROUND OF THE INVENTION

1. Field of the Invention

The present invention relates to an optical recording medium for optically recording and reproducing information, a substrate for the optical recording medium for use in the optical recording medium, and a method for preparing the substrate.

2. Related Background Art

Heretofore, an optical recording medium is constituted of a transparent substrate which transmits light for recording/reproduction such as a semiconductor laser beam, a recording layer disposed on the substrate, and if necessary, a protective layer on the recording layer. As a material for the substrate, there has been widely used a polycarbonate resin having excellent transparency and strength and low hygroscopicity. The polycarbonate resin referred to herein means a usual polycarbonate resin which has been heretofore industrially produced, for example, a bis(hydroxyphenyl)alkane series polycarbonate resin. The substrate for the optical recording medium (hereinafter abbreviated to "substrate") which comprises such a polycarbonate resin tends to cause deteriorations such as discoloration and the decrease of molecular weight by the irradiation of natural light (particularly its ultraviolet component), and therefore it is desired to prevent the photo-deterioration. For this prevention, a technique of adding a UV absorber to the substrate is known.

However, in the case that a usual UV absorber such as 2-(5-methyl-2-hydroxyphenyl)benzotriazole or 2-[2-hydroxy-3-(3,4,5,6-tetrahydrophthalimidomethyl)-5-methylphenyl]benzotriazole is used as the UV absorber and the optical recording medium made of the substrate containing such a UV absorber is allowed to stand for a long period of time under a high-temperature and high-humidity atmosphere, the UV absorber has an unpreferable influence on the recording layer sometimes. For example, when an organic coloring matter is used for the recording layer, the UV absorber deteriorates its reflectance, and when a photomagnetic film is used as the recording layer, the UV absorber causes pitting corrosion in the film to lower a bit error rate inconveniently.

SUMMARY OF THE INVENTION

The present invention has been intended in view of the above-mentioned problems, and an object of the present invention is to provide a polycarbonate substrate for an optical recording medium in which a deterioration caused by UV light is inhibited without badly affecting a recording layer.

Another object of the present invention is to provide an optical recording medium in which the recording layer scarcely deteriorates even under high-temperature and high-humidity conditions and the polycarbonate substrate is inhibited from deteriorating.

Still another object of the present invention is to provide a method for preparing a substrate for an optical recording medium by which the polycarbonate substrate for the optical recording medium having improved light resistance can be manufactured at a low cost without badly affecting the recording layer.

In one aspect of the present invention, there is provided an optical recording medium comprising a substrate containing a polycarbonate resin and a recording layer, said substrate containing a copolycarbonate resin having constitutional units represented by the formulae (x) and (y)

[wherein Z of the formula (x) is a direct bond, alkylidene, —O—, —S— or —SO$_2$—; X is H, halogen, alkyl, aryl, aralkyl, alkoxy, aryloxy or aralkyloxy; R$_1$ is H, alkyl or aralkyl; m is an integer of 1 to 3; Y of the formula (y) is alkylidene, aryl-substituted alkylene, aryl, —O—, —S—, —CO— or —SO$_2$—; and each of R$_2$, R$_3$, R$_4$ and R$_5$ is H, halogen or alkyl].

In another aspect of the present invention, there is provided a substrate for an optical recording medium comprising a polycarbonate resin, said substrate containing a copolycarbonate resin having constitutional units represented by the formulae (x) and (y)

[wherein Z of the formula (x) is a direct bond, alkylidene, —O—, —S— or —SO$_2$—; X is H, halogen, alkyl, aryl, aralkyl, alkoxy, aryloxy or aralkyloxy; R$_1$ is H, alkyl or aralkyl; m is an integer of 1 to 3; Y of the formula (y) is alkylidene, aryl-substituted alkylene, aryl, —O—, —S—, —CO— or —SO$_2$—; and each of R$_2$, R$_3$, R$_4$ and R$_5$ is H, halogen or alkyl].

In a further aspect of the present invention, there is provided a method for preparing a substrate for an optical recording medium comprising a step of melting and extruding a polycarbonate resin containing a copolycarbonate resin having constitutional units represented by the following formulae (x) and (y) to mold the resin into a resin sheet, and a step of pressing the resin sheet between a roll stamper having a preformat pattern on its peripheral surface and a roll arranged so as to confront the roll stamper to transfer the preformat pattern to the surface of the resin sheet:

[wherein Z of the formula (x) is a direct bond, alkylidene, —O—, —S— or —SO$_2$—; X is H, halogen, alkyl, aryl, aralkyl, alkoxy, aryloxy or aralkyloxy; R$_1$ is H, alkyl or aralkyl; m is an integer of 1 to 3; Y of the formula (y) is alkylidene, aryl-substituted alkylene, aryl, —O—, —S—, —CO— or —SO$_2$—; and each of R$_2$, R$_3$, R$_4$ and R$_5$ is H, halogen or alkyl].

In a still further aspect of the present invention, there is provided a substrate for an optical recording medium comprising a copolycarbonate resin having constitutional units represented by the formulae (x) and (y)

[wherein Z of the formula (x) is a direct bond, alkylidene, —O—, —S— or —SO$_2$—; X is H, halogen, alkyl, aryl, aralkyl, alkoxy, aryloxy or aralkyloxy; R$_1$ is H, alkyl or aralkyl; m is an integer of 1 to 3; Y of the formula (y) is alkylidene, aryl-substituted alkylene, aryl, —O—, —S—, —CO— or —SO$_2$—; and each of R$_2$, R$_3$, R$_4$ and R$_5$ is H, halogen or alkyl].

In still another aspect of the present invention, there is provided an optical recording medium comprising a resin substrate and a recording layer, said substrate containing a copolycarbonate resin having constitutional units represented by the formulae (x) and (y)

DETAILED DESCRIPTION OF THE PREFERRED EMBODIMENTS

Next, the present invention will be described in detail in reference to drawings.

Figure 1:
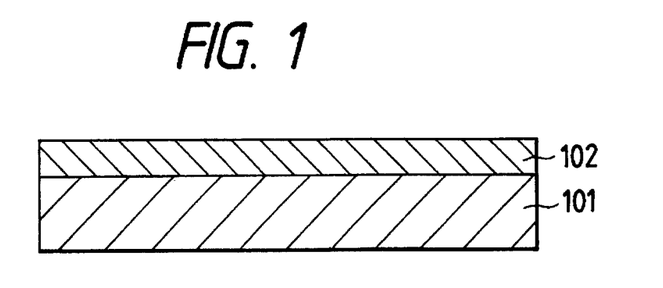
FIG. 1 is a schematic sectional view of one embodiment of an optical recording medium of the present invention.

FIG. 1 is a schematic sectional view of an optical recording medium regarding the present invention, and in this drawing, reference numeral 101 is a substrate containing a polycarbonate resin, and numeral 102 is an optical recording medium. The optical recording medium of the present invention is characterized in that the polycarbonate resin-containing substrate 101 contains a copolycarbonate resin having constitutional units represented by the following formulae (x) and (y):

[wherein Z of the formula (x) is a direct bond, alkylidene, —O—, —S— or —SO$_2$—; X is H, halogen, alkyl, aryl, aralkyl, alkoxy, aryloxy or aralkyloxy; R$_1$ is H, alkyl or aralkyl; m is an integer of 1 to 3; Y of the formula (y) is alkylidene, aryl-substituted alkylene, aryl, —O—, —S—, —CO— or —SO$_2$—; and each of R$_2$, R$_3$, R$_4$ and R$_5$ is H, halogen or alkyl].

The direct bond represented by Z in the formula (x) means that the constitutional unit represented by the formula (x) takes one of structures shown by the formulae (x)-1 to (x)-3:

When the optical recording medium is constituted by the use of the polycarbonate substrate of the present invention, the photo-deterioration of the substrate can be inhibited, and the deterioration of the recording layer can be sufficiently inhibited even if the optical recording medium is allowed to stand for a long period of time under high-temperature and high-humidity conditions.

Examples of the alkylidene group represented by Z in the constitutional unit of the formula (x) in the copolycarbonate which can be used in the present invention include methylene, ethylidene, propylidene, isopropylidene, butylidene, octylidene and decylidene. These alkylidene groups may be substituted by a phenyl group and an aryl group. Furthermore, the alkylidene having 1 to 10 carbon atoms which can be used as Z is preferable because of inhibiting an orientation of the copolycarbonate molecule and decreasing a birefringence of the substrate.

Examples of the alkyl group which can be used as the substituent $R_1$ in the formula (x) include methyl, ethyl, propyl, isopropyl, butyl, isobutyl, sec-butyl, t-butyl amyl, t-amyl, hexyl, heptyl, octyl, isooctyl, 2-ethylhexyl, 1,1,3,3-tetramethylbutyl, nonyl, decyl, isodecyl, dodecyl, octadecyl, 2-hydroxybutyl and 3-hydroxypropyl. Examples of the aralkyl group include benzyl, phenethyl, α-naphthylmethyl, β-naphtylmethyl, carboxybenzyl, sulfobenzyl and p-methylbenzyl.

In the case that $R_1$ is an alkyl group or an aralkyl group having 5 to 15 carbon atoms, the recording layer formed by, for example, a wet coating method has an improved uniformity of the layer thickness to inhibit the non-uniformity of reflectance from occurring in the recording layer. That is, when the recording layer is applied by a gravure coating method, the layer thickness is unstable along edge portions of the applied range and a difference of the reflectance appears between the edge portions and the central portion of the applied range sometimes. According to the present invention, however, it can be presumed that the wettability of the substrate surface to an organic solvent finely changes, whereby the difference of the reflectance attributed to the uneven layer thickness can be eliminated, with the result that the enlargement of a recording region can be achieved.

Examples of the halogen which can be used as the substituent X in the formula (x) include chlorine, bromine, iodine and fluorine, and examples of the alkyl group and the aralkyl group are the same as defined in the description of $R_1$. Examples of the alkoxy group include alkoxy groups such as methoxy, ethoxy and propoxy derived from the above-mentioned alkyl groups, and an example of the aryl groups is a phenyl group. In addition, an example of the aryloxy group is a phenoxy group, and an example of aralkyloxy group is an aralkyloxy group derived from the above-mentioned aralkyl group.

Preferable examples of the alkylidene group represented by Y in the formula (y) include straight-chain and branched alkylidene groups which can be used as the above-mentioned group Z as well as a cyclic alkylidene group such as a cyclohexylidene group, and it is preferable to use the alkylidene group having 1 to 10 carbon atoms for the same reason as described above.

Examples of the aryl-substituted alkylene group include ethylene, propylene, butylene, amylene ($C_5H_{10}$=) and hexylene ($C_6H_{12}$=) groups substituted by, for example, a phenyl group. In the case that the aryl-substituted alkylene group is used as Y in the present invention, it is preferable that the straight chain of the alkylene group has 1 to 10 carbon atoms, preferably 1 to 6 carbon atoms, for the purpose of maintaining the strength of the substrate.

Examples of the halogen which can be used as each of $R_2$ to $R_5$ in the formula (y) include chlorine, bromine, iodine and fluorine, and examples of the alkyl group include alkyl groups which can be used as the above-mentioned $R_1$. In the case that the alkyl group is used as each of $R_2$ to $R_5$, it is preferable to use the alkyl group having 1 to 4 carbon atoms, because of inhibiting the birefringence of the substrate.

Furthermore, the groups represented by $R_2$ to $R_5$ may be mutually identical or different.

The copolycarbonate which can be used in the present invention can be synthesized by the same procedure as in a conventional aromatic polycarbonate resin except that dihydric phenols represented by the formulae (1) and (2) are used:

That is, there can be utilized an interfacial polymerization method in which the dihydric phenol compounds of the formulae (1) and (2) are reacted with phosgene in the presence of an organic solvent which is inert to the reaction, an aqueous alkaline solution and if necessary, a molecular weight modifier (a terminator), and a polymerization catalyst such as a tertiary amine or a quaternary ammonium salt is then added; or a pyridine method in which the same dihydric phenol compounds and molecular weight modifier are dissolved in pyridine or a mixed solution of pyridine and an inert solvent, and phosgene is then blown thereinto.

The copolycarbonate resin which can be used in the present invention has 4 kinds of chemical structures, i.e., a random copolymer in which the constitutional units (x) and (y) are randomly arranged, an alternating copolymer in which the constitutional units (x) and (y) are alternately arranged, a block copolymer in which blocks formed by the linkage of the plural constitutional units (x) are bonded to blocks formed by the linkage of plural constitutional units (y), and a graft copolymer in which blocks of a polymer comprising the constitutional units (x) branch from the main chain polymer comprising the constitutional unit (y). In the present invention, any of these chemical structures can be used.

With regard to a ratio between the constitutional units (x) and (y) of the copolycarbonate of the present invention, it is preferred that a ratio of the dihydric phenol of the constitutional unit (x) to the total dihydric phenols is in the range of 0.1 to 70 mole % in terms of dihydric phenols of the polycarbonate so that the copolycarbonate may have a sufficient UV absorptive power, and in view of the birefringence of the substrate, it is more preferably 10 to 40 mole %, most preferably 15 to 35 mole %. The reason why this range is preferable to inhibit the birefringence of the substrate is not apparent, but when the ratio of the constitutional unit (x) is high, this unit gives rise to a steric hindrance to affect the molecular orientation of the copolycarbonate.

The molecular weight of the copolycarbonate resin which can be used in the present invention is preferably in the range of about $0.1 \times 10^4$ to about $4.0 \times 10^4$ in terms of a viscosity-average molecular weight in view of a compatibility of the copolycarbonate resin with the polycarbonate resin at a melting step and an influence of the optical recording medium on the optical recording layer.

A usable example of the polycarbonate resin which will be mixed with the copolycarbonate according to the present invention is a usual polycarbonate such as a bis(hydroxyphenyl)alkane series polycarbonate resin. This bis(hydroxyphenyl)alkane series polycarbonate resin is an aromatic hydrocarbon polymer having the repeating unit represented by the constitutional unit (y) which can be obtained by reacting a hydroxydi(mononuclear or binuclear aryl) compound such as a bis(4-hydroxyphenyl)alkane with a carbonate precursor such as phosgene, formate or a carbonate ester.

The viscosity-average molecular weight of the polycarbonate resin which can be used in the present invention is preferably in the range of about 15,000 to about 22,000 in consideration of mechanical properties and moldability.

In the substrate of the present invention, the amount of the copolycarbonate to be mixed with the polycarbonate is in the range of 0.1 to 20% by weight, more preferably 0.3 to 5% by weight, most preferably 0.5 to 2% by weight based on the weight of the polycarbonate resin. In the case that the copolycarbonate is used in an amount within the above-mentioned range, the sufficient UV absorptive power can be imparted to the substrate and the influence on the recording layer can be inhibited preferably.

Figure 2:
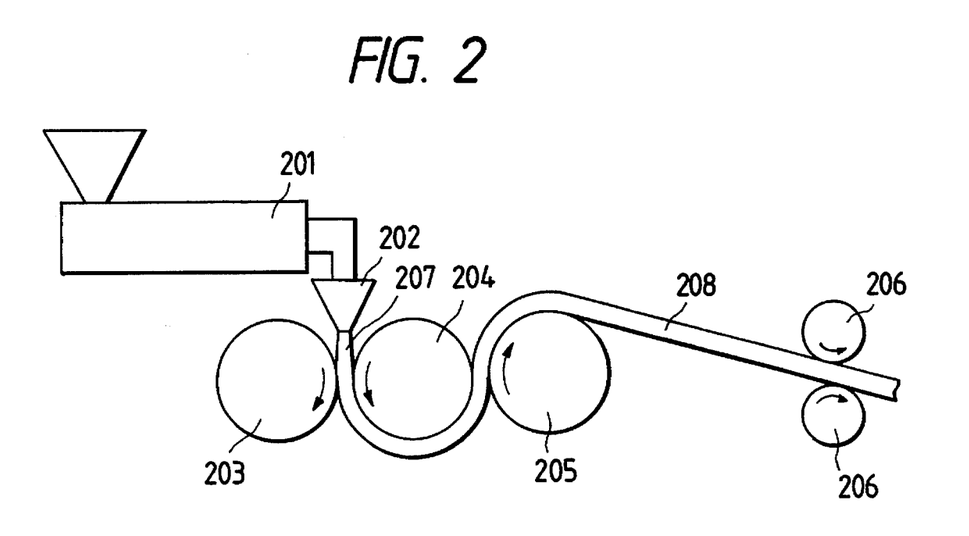
FIG. 2 is a schematic view of one embodiment of a method for preparing a substrate for the optical recording medium of the present invention.
Figure 3:
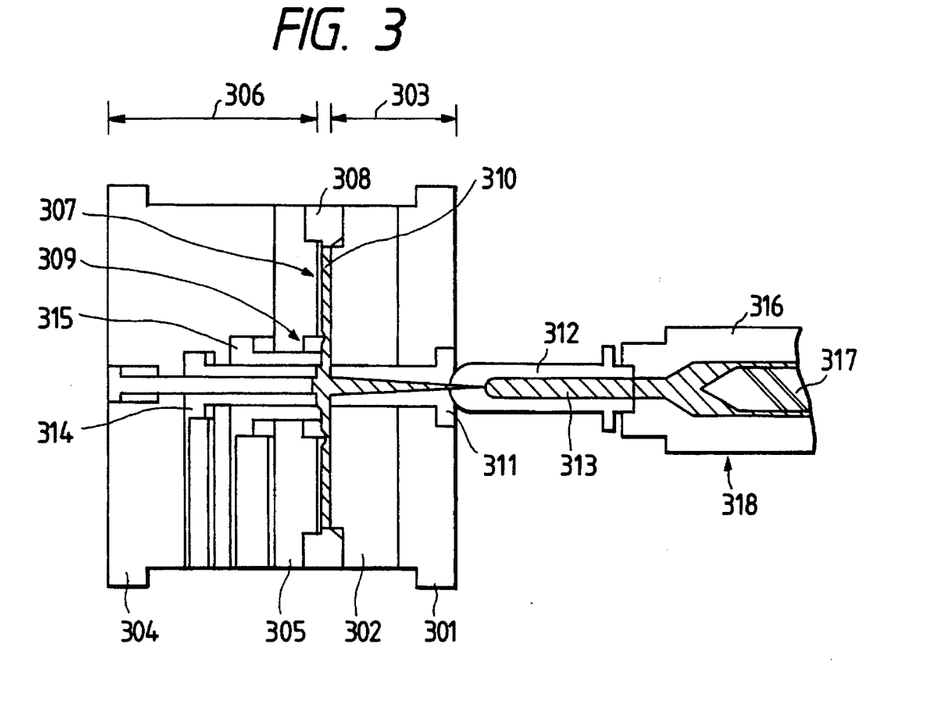
FIG. 3 is a schematic view of another embodiment of the method for preparing the substrate for the optical recording medium of the present invention.

The substrate of the present invention can be manufactured by a known method for molding the substrate, for example, an injection molding method, an injection compression molding method, a compression method, a casting method or an extrusion molding method, but the substrate of the present invention is extremely congenial to a molding method suitable for mass production such as the injection molding method, the injection compression molding method or the extrusion molding method. That is, in the above-mentioned molding method, the resin is previously molten, and when the polycarbonate to which a conventional UV absorber is added is used, the UV absorber is volatilized while the resin is molten. Thus, each time the molding is repeated, the stamper and the molding rolls are contaminated with the UV absorber, and therefore it is difficult to continuously carry out the molding for a long period of time. However, when the substrate material of the present invention is used, the volatilization of components is scarcely observed even while the material is molten. Therefore, even during the continuous molding, the stamper and the molding rolls are scarcely contaminated, which permits the continuous molding for a long period of time. Next, the molding procedure of the substrate regarding the present invention by the use of each of the extrusion molding method and the injection molding method will be described in reference to drawings.

That is, FIG. 2 is a schematic sectional view of an apparatus for use in the extrusion molding method to prepare the substrate of the present invention, and reference numeral 201 is an extruder, numeral 202 is a die for shaping, into a sheet form, a resin molten by the extruder 201. Numeral 204 is a roll stamper, on the peripheral surface of which a preformat pattern corresponding to a preformat is formed, and 203 and 205 are mirror rolls arranged so as to confront roll stamper. The above-mentioned die 202 for the sheet is arranged so that the molten resin sheet may be extruded from the die to the space between the roll stamper 204 and the mirror roll 203.

In the first place, a mixture of a polycarbonate resin and the copolycarbonate resin according to the present invention is thrown into the extruder 201, and the resin mixture is molten and then extruded into the molten resin sheet 207 through the die 202.

At this time, for example, in the case of the polycarbonate resin, the temperature of the resin is set to 260°–350° C.

Next, the molten resin sheet 207 is first pressed between the mirror roll 203 and the roll stamper 204 and then between the roll stamper 204 and the mirror roll 205 to transfer the preformat pattern on the surface of the roll stamper 204 to the surface of the molten resin sheet 207, whereby a substrate sheet 208 is molded. In this case, the roll stamper 204 of the present invention is maintained at such a temperature as to cool the resin sheet to its heat deformation temperature or less without forming strain and wrinkles in the resin sheet on the roll stamper 204.

That is, the roll stamper is preferably heated in the range of +20° to −20° C. of the heat deformation temperature of the used resin, and for example, in the case that the polycarbonate resin is molded, the surface of the roll stamper is preferably heated to a temperature of 100° to 160° C. When the temperature of the roll stamper is within the above-mentioned range, the molten resin sheet is not quenched and therefore shrinkage and strain scarcely appear in the resin sheet. The temperature of the mirror rolls arranged so as to confront the roll stamper is preferably set to the same temperature as that of the roll stamper or a little lower level.

The temperatures of these rolls can be controlled, for example, by the electrical heating of a heater embedded in the rolls or by the circulation of a heating medium through the central portions of the rolls.

The die for the sheet, the mirror roll 203 and the roll stamper 204 are constituted to mutually cooperate so that the resin sheet extruded through the die for the sheet may be pressed between the mirror roll 203 and the roll stamper 204 so as to obtain a substrate sheet having a thickness of, for example, 0.3–1.5 mm in a cooling step.

FIG. 3 is a schematic view of an injection molding equipment which can be used in the method for preparing a substrate of the present invention by the injection molding. In FIG. 3, reference numeral 301 is a fixed side form, and numeral 302 is a fixed side mirror supported by the fixed side form, and both of these members constitute a fixed side mold 303. Numeral 304 is a movable side form, and 305 is a movable side mirror supported by the movable side form, and both of these members constitute a movable side mold 306. On the surface of the movable side mirror 305, there is fixed a stamper 307 for forming a preformat comprising pits for information, pits for tracking, tracking grooves or the like on the substrate by an outer peripheral stamper holder 308 and an inner peripheral stamper holder 309. Numeral 310 is a cavity defined by the fixed side mirror 302 and the movable side mirror 305 in a condition that the fixed side mold 303 and the movable side mold 306 are closed. Numeral 311 is a sprue bush which is inserted into the fixed side mold 303 and which constitutes a passage for leading, to the cavity 310, the molten resin fed through an injection equipment 318 comprising a screw cylinder 316 and an injection nozzle 312 attached on its tip. The injection molding method of the substrate by the use of the injection molding equipment equipped with the members 301 to 318 comprises bringing the injection nozzle 312 into contact with the sprue bush 311, filling the cavity 310 via the sprue bush 311 with a mixture 313 of the polycarbonate resin and the copolycarbonate resin of the present invention which has been molten in the injection equipment 318, cooling the resin to solidify itself and forming a central hole in the substrate by the use of a gate cutter 314 disposed in the movable side mold 306, and then releasing the substrate from the stamper 307 by an ejector 315, thereby obtaining the substrate in which the preformat is formed on its surface.

In the above-mentioned manufacturing method of the substrate of the present invention, a release agent may be added to the resin mixture in order to improve the release of the substrate from the stamper or the roll stamper.

Usable examples of the release agent include known various compounds, such as esters of polyhydric alcohols and acids, but in view of the influence of the release agent on the optical recording layer, an ester of an saturated aliphatic monocarboxylic acid represented by the formula (3) and a polyhydric alcohol represented by the formula (4) can be suitably used. In particular, pentaerythritol tetrastearate is a preferable material:

$$C_pH_{2p+1}\text{—COOH} \tag{3}$$

(wherein p is a natural number)

$$\begin{array}{c}\text{HOCH}_2 \diagdown \quad \diagup \text{CH}_2\text{OH} \\ \text{C} \\ \text{HOCH}_2 \diagup \quad \diagdown \text{CH}_2\text{OH}\end{array} \tag{4}$$

The content of the release agent in the resin mixture is preferably from 0.01 to 0.09% by weight, more preferably from 0.02 to 0.08% by weight based on the weight of the mixture.

If the content of the release agent is more than 0.09% by weight, for example, in the case that the recording layer is formed with an organic coloring matter by a wet coating method, the resultant coating film is contaminated with the release agent to change the reflectance of the recording layer. Furthermore, when the recording layer is formed by a vacuum deposition method (e.g., vapor deposition or sputtering), for example, a photo-magnetic film, the adhesive properties of the substrate to the recording layer are insufficient, which causes pitting corrosion and the like.

On the substrate prepared by the above-mentioned method, the recording layer is formed, and if necessary, the protective layer is further formed thereon to obtain the optical recording medium.

No particular restriction is put on the recording layer used in the optical recording medium of the present invention, and for example, an organic coloring matter or a photo-magnetic recording layer can be used as the recording layer. The organic coloring matter for the recording layer of the optical recording medium of the present invention preferably has a large difference between the reflectance in pits which are recorded portions and that in unrecorded portions in the vicinity of the wavelength of light used for recording/reproduction, for example, in a wavelength of 650 nm or more which is the wavelength of energy beams of reproducing light, particularly in the range of 700 to 900 nm. Furthermore, in order to achieve the recording, the organic coloring matter is required to have an absorption in the wavelength region. Moreover, it is preferred that energy required to cause the change of the reflectance by the irradiation of the energy beams is small. In addition, it is also preferred that the reflectances of the recorded portions (pits or the like) and the unrecorded portions are scarcely altered by the energy beams of the reproducing light.

Examples of the organic coloring matter include anthraquinone derivatives (particularly substances having an indanthrene skeleton), dioxazine compounds and their derivatives, triphenodithiazine compounds, phenanthrene derivatives, cyanine compounds, merocyanine compounds, pyrylium compounds, xanthene compounds, triphenylmethane compounds, croconium-based coloring matters, azo coloring matters, crocons, azines, indigoids, polymethine coloring matters, azulenes, squarilium derivatives, sulfur dyes and dithiolate complexes of metals.

The above-mentioned coloring matter may be mixed with a stabilizer. Examples of the stabilizer include various kinds of metal chelate compounds, particularly multidentate ligands having Zn, Cu, Ni, Cr, Co, Mn, Pd and Zr as central metals, for example, tetradenstate ligands such as $N_4$, $N_2O_2$, $N_2S_2S_4$, $O_2S_2$ and $O_4$ combinations thereof, various kinds of aromatic amines and diamines, nitrogen-containing aromatic compounds and onium salts thereof, for example, aminium salts, diimonium salts, pyridinium salts, imidazolinium salts and quinolium salts. In addition, pyrylium salts which are salts of oxygen-containing aromatic compounds can also be used. These stabilizers may be used in a combination of two or more thereof.

The stabilizer should be selected in consideration of its compatibility with a solvent to be used together with the above-mentioned organic coloring matter. The amount of the stabilizer is preferably in the range of 1% by weight to 50% by weight, more preferably 10% by weight to 30% by weight based on the weight of the organic coloring matter, and particularly when the stabilizer is used in the latter range, the deterioration of sensitivity is inhibited and the effect of the stabilizer is also high.

The solvent for dissolving the organic coloring matter, the stabilizer and the like therein must not attack the resin sheet, and usable examples of the solvent include diacetone alcohol, cellosolve, 1-methoxy-2-propanol and mixed solvents prepared by adding a small amount of a halogen-based solvent to the above-mentioned solvents.

A typical example of the photo-magnetic recording layer which can be used as the recording layer of the optical recording medium of the present invention is a magnetic film comprising an alloy of a rare earth element and a transition metal element such as TbFeCo, TbFeGd, NdFeCo or NdDyFeCo.

In the present invention, a typical example of the preformat pattern is a pattern corresponding to tracking grooves for an optical disc or an optical card of 1–5 μm in pitch and about 200–5000 Å in depth having a spiral shape, a concentric circle shape or a stripe shape, or a pattern corresponding to tracking grooves for an optical disc or an optical card of 2–5 μm in width, 8–15 μm in pitch and about 200–5000 Å in depth having a spiral shape, a concentric circle shape or a stripe shape, or a pattern corresponding to prepits formed in or between these grooves.

As described above, according to the present invention, the high-quality optical recording medium can be obtained which can inhibit the substrate from deteriorating by ultraviolet rays and which can maintain shelf stability as the optical recording medium.

Furthermore, according to the present invention, the high-quality substrate for optical recording medium can be continuously manufactured with good productivity, which substrate can be inhibited from deteriorating by ultraviolet rays and which does not lower the shelf stability of the optical recording medium.

EXAMPLES

Now, the present invention will be described in more detail in reference to examples.

EXAMPLE 1

In the first place, a polycarbonate resin was prepared by adding 0.04% by weight of pentaerythritol tetrastearate as a release agent to a polycarbonate resin (viscosity-average molecular weight 20000) obtained by polymerizing bisphenol A.

As a copolycarbonate resin, there was prepared a copolymer of 2,2'-methylenebis-6-benzotriazolylphenol, which was a benzotriazole compound, and bisphenol A (molar ratio 1:6, viscosity-average molecular weight $1.1 \times 10^4$), and 1 part by weight of this copolycarbonate resin was added to 100 parts by weight of the polycarbonate resin.

Next, the resin mixture was poured into an extruder 201 of a molding equipment shown in FIG. 2 and then molded into a substrate sheet for an optical card. In the molding equipment shown in FIG. 2, as mirror rolls 203, 205, there were used rolls which had a diameter of 30 cm and a peripheral surface plated with chromium and which were made of carbon steel. Furthermore, as a roll stamper, there was used a roll which had a diameter of 30 cm and a peripheral surface plated with chromium and which was made of carbon steel, and a nickel stamper having a thickness of 100 μm and a preformat pattern for optical card was fixed on the peripheral surface of the roll via a polyimide sheet having a thickness of 100 μm.

The preformat pattern for the optical card was a pattern corresponding to tracking Grooves for optical cards of 85

Figure 4:
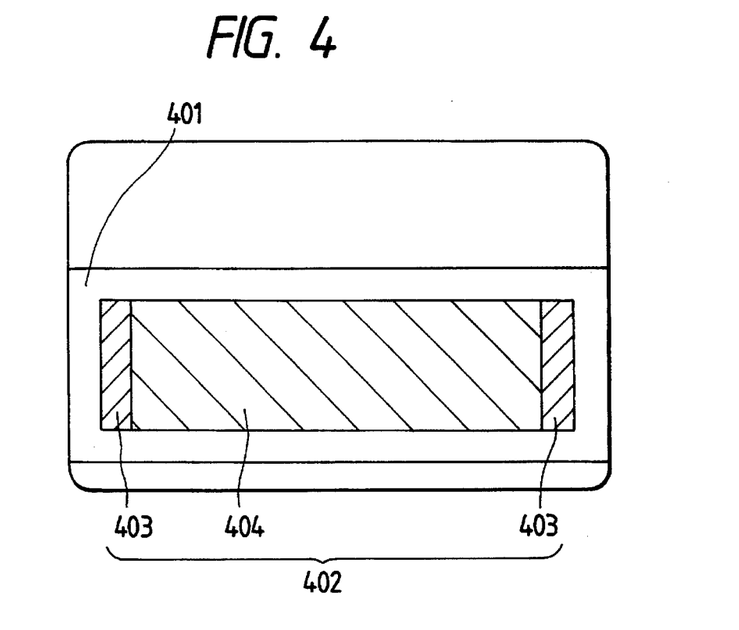
FIG. 4 is an illustrative view of an evaluation procedure of an optical card regarding an example of the present invention.

Next, this substrate sheet was cut to prepare a substrate for an optical card having a length (a) of 54 mm and a width (b) of 85 mm as shown in FIG. 4. Afterward, a diacetone alcohol solution of a polymethine coloring matter represented by the chemical formula (I) containing 25% by weight of an aminium salt compound represented by the chemical formula (II) was applied onto a predetermined region 402 in a preformat pattern-transferred region 401 on the preformat pattern-transferred surface of the substrate by a gravure coating method so that the thickness of a dry film might be 1,000 Å, thereby forming a recording layer thereon. Next, a polycarbonate protective layer having a thickness of 0.3 mm was stuck on the recording layer via an adhesive layer to prepare an optical card.

Next, the reflectance of regions 403 having a width of 5 mm at both the edges in the recording layer forming region 402 in the thus prepared optical card and that of a central region 404 were measured by the use of an optical card evaluating machine (made by Canon K.K.).

mm in length, 3 μm in width and 12 μm in pitch in a rectangular region of 30 mm in width and 85 mm in length.

As molding conditions, a die temperature was 300° C., the surface temperature of the mirror roll 203 was 125° C., the surface temperature of the roll stamper 204 was 135° C., the surface temperature of the mirror roll 205 was 140° C., the feed rate of the substrate sheet was 3.0 m/min, and the thickness of the substrate sheet was 0.4 mm. The substrate sheet was continuously molded for 8 hours under the above-mentioned conditions, and even after completion of the molding, any soils were not observed on the peripheral surfaces of the roll stamper 204 and the mirror rolls with the naked eye. Furthermore, the transfer precision of the preformat pattern to the obtained substrate sheet was as good as 98% or more, in all the preformat pattern-transferred portions on the substrate sheet. In the present invention, the transfer precision was evaluated as follows. A sectional shape of the preformat pattern-transferred portion on the substrate sheet was observed at 9 positions in a direction vertical to the track groove by an electron radiation surface morphology analyzer (trade name ESA-3000; made by ERIONIX CO., LTD.) to measure a width a of a land in the groove-transferred portion of the substrate sheet and a width A of a bottom in the concave portion of the groove on the stamper, and the evaluation of the transfer precision was made by an average value of a/A.

Next, for this optical card, a 500 hours storage durability test was made under conditions of 43° C., 70% RH and 42 mW/cm² by the use of a xenon feed meter (trade name FAL-25AX-HC-B-Ec; made by Suga Testing Machine Co., Ltd.) to measure a reflectance change of the central region 404 before and after the durability test, and a drop ratio of the reflectance was then obtained, regarding an initial value as 100%.

For the substrate for the optical card prepared in this example, a storage durability test was made in the same manner as described above, and a yellow index (a Y.I. value) of the substrate was then measured by the use of a color computer (trade name SM-3-CH type; made by Suga Testing Machine Co., Ltd.). In this example, the standard of the Y.I. value was set to 2.5 which was usually required for the substrate.

EXAMPLE 2

The same procedure as in Example 1 was repeated except that a copolymer of 2,2'-methylenebis(4-octyl-6-benzotriazolylphenol) and bisphenol A (molar ratio 1:6; viscosity-average molecular weight $1.9 \times 10^4$) was used as a copolycarbonate resin, to prepare a substrate sheet for an optical card.

As a result, even after continuous molding for 8 hours, any soils were not observed on the peripheral surfaces of a roll stamper 204 and a mirror roll 203, and the transfer precision of the preformat pattern to the obtained substrate sheet was good, 98% or more, in all preformat pattern-transferred portions on the substrate sheet.

Next, this substrate sheet was cut, and an optical card was then prepared in the same manner as in Example 1. Afterward, evaluation was given in the same manner as in Example 1.

EXAMPLE 3

The same procedure as in Example 2 was repeated except that no pentaerythritol tetrastearate was added to a resin mixture, to prepare a substrate sheet for an optical card.

As a result, even after continuous molding for 8 hours, any soils were not observed on the peripheral surfaces of a roll stamper 204 and a mirror roll 203. However, the transfer precision of the preformat pattern to the obtained substrate sheet was 95 to 96% in almost all of the preformat pattern-transferred portions.

Next, this substrate sheet was used to prepare an optical card in the same manner as in Example 1. Afterward, evaluation was given in the same manner as in Example 1.

COMPARATIVE EXAMPLE 1

Molding was carried out under the same conditions as in Example 1 except that any copolycarbonate resin was not mixed and a compound represented by the following structural formula (III) was mixed in a weight ratio of 0.3% as a UV absorber:

As a result, one hour after the start of the molding, the adhesion of soils was begun on the surface of a mirror roll 203, and a substrate which was afterward molded was poor in flatness, and a transfer precision was 50% or less. Thus, the sheet could not be used as the substrate for an optical card.

Next, the substrate obtained immediately after the start of the above-mentioned molding was used to prepare an optical card in the same manner as in Example 1, and evaluation was then given in the same manner as in Example 1.

COMPARATIVE EXAMPLE 2

Molding was carried out under the same conditions as in Example 1 except that any copolycarbonate resin was not mixed and a compound represented by the following structural formula (IV) was mixed in a weight ratio of 0.3% as a UV absorber:

As a result, 30 minutes after the start of the molding, the adhesion of soils was begun on the surface of a mirror roll 203, and a substrate which was afterward molded was poor in-flatness, and a transfer precision deteriorated to 50% or less. Thus, the sheet could not be used as the substrate for an optical card.

Next, the substrate obtained immediately after the start of the above-mentioned molding was used to prepare an optical card in the same manner as in Example 1, and evaluation was then given in the same manner as in Example 1.

REFERENCE EXAMPLE 1

The same procedure as in Example 2 was repeated except that the amount of copolycarbonate was changed to 30 parts by weight based on 100 parts by weight of polycarbonate resin, to prepare a substrate sheet for an optical card.

As a result, even after continuous molding for 8 hours, any soils were not observed on the peripheral surfaces of a roll stamper 204 and a mirror roll 203, and the transfer precision of the preformat pattern to the obtained substrate sheet was good, 98% or more, in all preformat pattern-transferred portions.

Next, this substrate sheet was cut, and an optical card was then prepared in the same manner as in Example 1. Afterward, evaluation was given in the same manner as in Example 1.

The evaluation results of Examples 1 to 3, Comparative Examples 1 and 2, and Reference Example 1 are shown in Table 1.

TABLE 1

|  | Difference of Reflectance between Regions 403 and 404 | Drop Ratio of Reflectance after Storage Durability Test | Y.I. of Substrate after Storage Durability Test |
|---|---|---|---|
| Example 1 | B | A | A |
| Example 2 | A | A | A |
| Example 3 | A | A | A |
| Comp. Ex. 1 | B | C | A |
| Comp. Ex. 2 | B | C | A |
| Ref. Ex. 1 | A | B | A |

Ranking of Evaluation:
The difference of the reflectance between the regions 403 and 404
A: within ±2%
B: more than ±2%
The drop ratio of the reflectance after the storage durability test
A: 5% or less TABLE 1-continued

| | Difference of Reflectance between Regions 403 and 404 | Drop Ratio of Reflectance after Storage Durability Test | Y.I. of Substrate after Storage Durability Test |
|---|---|---|---|

B: more than 5% and 10% or less
C: more than 10%
Y.I. of the substrate after the storage durability test
A: 2.5 or less
B: more than 2.5

EXAMPLE 4

There was prepared the same resin mixture as in Example 1 except that the content of a release agent was changed to 0.08% by weight.

In a molding equipment in FIG. 2, a stamper fixed on the peripheral surface of a roll stamper was replaced with a nickel stamper having a thickness of 150 μm and provided with a preformat pattern for an optical disc, and as molding conditions, the feed rate of a substrate sheet was 1.8 m/min, the surface temperature of a mirror roll 203 was 120° C., the surface temperature of a roll stamper 204 was 125° C., the surface temperature of a mirror roll 205 was 135° C., and the thickness of the substrate sheet was 1.2 mm.

The preformat pattern for the optical disc was a pattern corresponding to tracking grooves of 0.6 μm in width, 1.6 μm in pitch and 1,000 Å in depth which was shaped into a spiral form in a doughnut-like region having an outer diameter of 128 mm and an inner diameter of 58 mm. The substrate sheet for the optical disc was continuously molded for 7 hours under the above-mentioned conditions, and even after completion of the molding, any soils were not confirmed on the peripheral surfaces of a roll stamper 204 and a mirror roll 203 with the naked eye. Moreover, the transfer precision of the preformat pattern to the obtained substrate sheet was good, 97% or more, in all preformat pattern-transferred portions.

On the thus obtained substrate for the optical disc, a recording layer having a thickness of 1,000 Å was formed with the same coloring matter as in Example 1 by a spin coating method, and a polycarbonate protective layer having a thickness of 1.2 mm was stuck on the recording layer via an adhesive layer to prepare an optical disc. For the thus prepared optical disc, a storage durability test was made in the same manner as in Example 1. A reflectance change before and after the durability test was measured, and as a result, the reflectance after the test was 95%. Even after the storage durability test, stable recording and reproduction of information was possible.

Furthermore, for the substrate for an optical disc prepared in Example 3, the above-mentioned storage durability test was made, and a yellow index (a Y.I. value) of the substrate was then measured in the same manner as in Example 1. As a result, the Y.I. value was not more than 2.5 which was a specified value.

What is claimed is:

1. An optical recording medium which comprises a substrate containing a polycarbonate resin and a recording layer, said substrate containing a copolycarbonate resin having constitutional units represented by the formulae (x) and (y)

wherein z of the formula (x) is a direct bond, alkylidene, —O—, —S— or —SO$_2$—; X is H, halogen, alkyl, aryl, aralkyl, alkoxy, aryloxy or aralkyloxy; R$_1$ is H, alkyl or aralkyl; m is an integer of 1 to 3; Y of the formula (y) is alkylidene, aryl, —O—, —S—, —CO—, —SO$_2$— or aryl-substituted alkylene, wherein the alkylene is selected from the group consisting of ethylene, propylene, butylene, amylene and hexylene; and each of R$_2$, R$_3$, R$_4$ and R$_5$ is H, halogen or alkyl; and wherein the amount of said copolycarbonate resin mixed with said polycarbonate resin in said substrate is in the range of 0.1 to 20% by weight based on the weight of said polycarbonate resin.

2. The optical recording medium according to claim 1 wherein the substituent R$_1$ in said copolycarbonate resin is an alkyl group or an aralkyl group having 5 to 15 carbon atoms.

3. The optical recording medium according to claim 1 wherein each of the substituents R$_2$ to R$_5$ in said copolycarbonate resin is an alkyl group having 1 to 4 carbon atoms.

4. The optical recording medium according to claim 1 wherein a ratio of said constitutional unit represented by said structural formula (x) in said copolycarbonate resin is in the range of 0.1 to 70 mole %.

5. The optical recording medium according to claim 1 wherein the viscosity-average molecular weight of said polycarbonate resin is in the range of $0.1 \times 10^4$ to $4.0 \times 10^4$.

6. The optical recording medium according to claim 1 wherein said polycarbonate resin is a bis(hydroxyphenyl)alkane series polycarbonate resin.

7. The optical recording medium according to claim 1 wherein the amount of said copolycarbonate resin to be mixed with said polycarbonate resin in said substrate is in the range of 0.3 to 5% by weight based on the weight of said polycarbonate resin.

8. The optical recording medium according to claim 1 wherein the amount of said copolycarbonate resin to be mixed with said polycarbonate resin in said substrate is in the range of 0.5 to 2% by weight based on the weight of said polycarbonate resin.

9. The optical recording medium according to claim 1 wherein said recording layer contains an organic coloring matter.

10. The optical recording medium according to claim 1 wherein a preformat is provided on the surface of said substrate which confronts said recording layer.

11. The optical recording medium according to claim 1 wherein said substrate contains an ester of a saturated aliphatic monocarboxylic acid represented by the formula (3) and a polyhydric alcohol represented by the formula (4):

$$C_pH_{2p+1}—COOH \tag{3}$$

wherein p is an integer $$\begin{array}{c} HOCH_2 \\ \diagdown \\ HOCH_2 \end{array} C \begin{array}{c} CH_2OH \\ \diagup \\ CH_2OH \end{array} \tag{4}$$

12. The optical recording medium according to claim 11 wherein the content of said ester is in the range of 0.01 to 0.09% by weight.

13. The optical recording medium according to claim 12 wherein said ester is pentaerythritol tetrastearate.

14. The optical recording medium according to claim 1 wherein said optical recording medium is an optical card.

15. The optical recording medium according to claim 1 wherein said optical recording medium is an optical disc.

16. A substrate for an optical recording medium which comprises a polycarbonate resin, said substrate containing a copolycarbonate resin having constitutional units represented by the formulae (x) and (y)

wherein Z of the formula (x) is a direct bond, alkylidene, —O—, —S— or —SO$_2$—; X is H, halogen, alkyl, aryl, aralkyl, alkoxy, aryloxy or aralkyloxy; $R_1$ is H, alkyl or aralkyl; m is an integer of 1 to 3; Y of the formula (y) is alkylidene, aryl, —O—, —S—, —CO—, —SO$_2$— or aryl-substituted alkylene, wherein the alkylene is selected from the group consisting of ethylene, propylene, butylene, amylene and hexylene; and each of $R_2$, $R_3$, $R_4$ and $R_5$ is H, halogen or alkyl; and wherein the amount of said copolycarbonate resin mixed with said polycarbonate resin in said substrate is in the range of 0.1 to 20% by weight based on the weight of said polycarbonate resin.

17. The substrate for an optical recording medium according to claim 16 wherein the substituent $R_1$ in said copolycarbonate resin is an alkyl group or an aralkyl group having 5 to 15 carbon atoms.

18. The substrate for an optical recording medium according to claim 16 wherein each of the substituents $R_2$ to $R_5$ in said copolycarbonate resin is an alkyl group having 1 to 4 carbon atoms.

19. The substrate for an optical recording medium according to claim 16 wherein a ratio of said constitutional unit represented by the structural formula (x) in said copolycarbonate resin is in the range of 0.1 to 70 mole %.

20. The substrate for an optical recording medium according to claim 16 wherein the viscosity-average molecular weight of said polycarbonate resin is in the range of $0.1 \times 10^4$ to $4.0 \times 10^4$.

21. The substrate for an optical recording medium according to claim 16 wherein said polycarbonate resin is a bis(hydroxyphenyl)alkane series polycarbonate resin.

22. The substrate for an optical recording medium according to claim 16 wherein the amount of said copolycarbonate resin to be mixed with said polycarbonate resin in said substrate is in the range of 0.3 to 5% by weight based on the weight of said polycarbonate resin.

23. The substrate for an optical recording medium according to claim 16 wherein the amount of said copolycarbonate resin to be mixed with said polycarbonate resin in said substrate is in the range of 0.5 to 2% by weight based on the weight of said polycarbonate resin.

24. The substrate for an optical recording medium according to claim 16 wherein a preformat is provided on at least one surface of said substrate.

25. The substrate for an optical recording medium according to claim 16 wherein said substrate contains an ester of a saturated aliphatic monocarboxylic acid represented by the formula (3) and a polyhydric alcohol represented by the formula (4):

$$C_pH_{2p+1}—COOH \tag{3}$$

wherein p is an integer $$\begin{array}{c} HOCH_2 \\ \diagdown \\ HOCH_2 \end{array} C \begin{array}{c} CH_2OH \\ \diagup \\ CH_2OH \end{array} \tag{4}$$

26. The substrate for an optical recording medium according to claim 25 wherein the content of said ester is in the range of 0.01 to 0.09% by weight.

27. The substrate for an optical recording medium according to claim 25 wherein said ester is pentaerythritol tetrastearate.

28. The substrate for an optical recording medium according to claim 16 wherein said substrate is a substrate for an optical card.

29. The substrate for an optical recording medium according to claim 16 wherein said substrate is a substrate for an optical disc.

30. An optical recording medium which comprises a resin substrate and a recording layer, said substrate containing a copolycarbonate resin in admixture with a second resin, said copolycarbonate resin having constitutional units represented by the formulae (x) and (y)

31. A substrate for an optical recording medium comprising a copolycarbonate resin in admixture with a second resin, said copolycarbonate resin having constitutional units represented by the formulae (x) and (y)

wherein Z of the formula (x) is a direct bond, alkylidene, —O—, —S— or —SO$_2$—; X is H, halogen, alkyl, aryl, aralkyl, alkoxy, aryloxy or aralkyloxy; $R_1$ is H, alkyl or aralkyl; m is an integer of 1 to 3; Y of the formula (y) is alkylidene, aryl, —O—, —S—, —CO—, —SO$_2$— or aryl-substituted alkylene, wherein the alkylene is selected from the group consisting of ethylene, propylene, butylene, amylene and hexylene; and each of $R_2$, $R_3$, $R_4$ and $R_5$ is H, halogen or alkyl; and wherein the amount of said copolycarbonate resin mixed with said second resin in said substrate is in the range of 0.1 to 20% by weight based on the weight of said second resin.

wherein Z of the formula (x) is a direct bond, alkylidene, —O—, —S— or —SO$_2$—; X is H, halogen, alkyl, aryl, aralkyl, alkoxy, aryloxy or aralkyloxy; $R_1$ is H, alkyl or aralkyl; m is an integer of 1 to 3; Y of the formula (y) is alkylidene, aryl, —O—, —S—, —CO—, —SO$_2$— or aryl-substituted alkylene, wherein the alkylene is selected from the group consisting of ethylene, propylene, buylene, amylene and hexylene; and each of $R_2$, $R_3$, $R_4$ and $R_5$ is H, halogen or alkyl; and wherein the amount of said copolycarbonate resin mixed with said second resin in said substrate is in the range of 0.1 to 20% by weight based on the weight of said second resin.

* * * * *

UNITED STATES PATENT AND TRADEMARK OFFICE
CERTIFICATE OF CORRECTION

PATENT NO. : 5,503,888
DATED : April 2, 1996
INVENTOR(S) : OSAMU KANOME, et al.

It is certified that error appears in the above-indentified patent and that said Letters Patent is hereby corrected as shown below:

COLUMN 6

Line 21, "structures" should read --the structures--; and
Line 26, " $O\!-\!\!-\!\!-$ " should read --$O\text{-}CO\!-\!\!-$--.

COLUMN 7

Line 44, "aralkyloxy" should read --the aralkyloxy--.

COLUMN 9

Line 48, "drawings" should read --the drawings--; and
Line 57, "roll" should read --the roll--.

COLUMN 10

Line 57, "with-the" should read --with the--.

COLUMN 11

Line 6, "an saturated" should read --a saturated--.

COLUMN 12

Line 4, "and $O_4$ combinations" should read --and $O_4$ and combinations--.

COLUMN 13

Line 16, "optical card" should read --the optical card--; and
Line 20, "Grooves" should read --grooves--.

UNITED STATES PATENT AND TRADEMARK OFFICE
CERTIFICATE OF CORRECTION

PATENT NO. : 5,503,888
DATED : April 2, 1996
INVENTOR(S) : OSAMU KANOME, et al.

It is certified that error appears in the above-indentified patent and that said Letters Patent is hereby corrected as shown below:

COLUMN 16

Line 17, "in-flatness" should read --in flatness--; and
    Line 46, "1to" should read --1 to--.

COLUMN 18

Line 34, "z" should read --Z--.

COLUMN 22

Line 30, "buylene" should read --butylene--.

Signed and Sealed this

Fifteenth Day of October, 1996

Attest:

BRUCE LEHMAN

Attesting Officer     Commissioner of Patents and Trademarks